US006718518B1

(12) United States Patent
Plow et al.

(10) Patent No.: US 6,718,518 B1
(45) Date of Patent: Apr. 6, 2004

(54) NON-DISRUPTIVE SEARCH FACILITY

(75) Inventors: Gregory M. Plow, Gilroy, CA (US); Farrokh E. Pourmirzaie, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/467,504

(22) Filed: Dec. 20, 1999

(51) Int. Cl.[7] .............................................. G06F 17/21
(52) U.S. Cl. ...................... 715/531; 715/540; 345/781; 707/3
(58) Field of Search ................................. 715/531, 530, 715/540; 345/795, 781; 707/3, 4, 5, 6

(56) References Cited

U.S. PATENT DOCUMENTS

| | | | |
|---|---|---|---|
| 4,907,173 A | | 3/1990 | Yamada et al. |
| 4,931,987 A | | 6/1990 | Kawakami |
| 4,975,690 A | * | 12/1990 | Torres ........................ 345/856 |
| 5,228,133 A | | 7/1993 | Oppedahl |
| 5,287,538 A | | 2/1994 | Kawakami et al. |
| 5,303,361 A | | 4/1994 | Colwell et al. |
| 5,510,808 A | | 4/1996 | Cina, Jr. et al. |
| 5,659,742 A | * | 8/1997 | Beattie et al. ........... 707/104.1 |
| 5,666,139 A | | 9/1997 | Thielens et al. |
| 5,802,516 A | | 9/1998 | Shwarts et al. |
| 5,930,809 A | * | 7/1999 | Middlebrook ............... 345/780 |

OTHER PUBLICATIONS

Mike Heck, "Insight publishes searchable documents for CDs, Web, and intranets," InfoWorld, vol. 19, No. 46, p. 110D(1), Nov. 1, 1997.*

Cary Griffith, "Creating full–text databases with ISYS," Information Today, vol. 14, No.8, p. 23(2), Sep. 1997.*

Barbara Burg and Amy M. Kautzman, "Getting down to business: CD–ROMs for the savvy manager," Searcher, vol. 5, No. 2, p. 12(4), Feb. 1997.*

Elaine X. Elliott, "Order from chaos," Computer Shopper, vol. 17, No. 2, p. 316(8), Feb. 1997.*

Microsoft Outlook Screenshot, 1999.*

Word Sniffer v1.4, Copyright 1997, Serge Danilov.*

* cited by examiner

*Primary Examiner*—Stephen S. Hong
*Assistant Examiner*—Doug Hutton
(74) *Attorney, Agent, or Firm*—Sawyer Law Group LLP

(57) ABSTRACT

A method and system for displaying the results of a search is disclosed. The method and system include the steps of displaying a first set of text in a first document in a first window, the first window being associated with an activated application program. The method and system further include initiating a first search within the first document based upon a first user interaction with the application program and displaying the results of the first search in a second window, where the first window continues to display the first set of text in the first document. Through the use of a system and method in accordance with the present invention, a user can view one or more portions of a document containing specified search strings while continuing to view the first window where reading and/or editing is occurring. Furthermore, the user can create, move, or resize second window by commonly known mouse operations. Further still, the user can display search results from files or documents that are different from the first document.

39 Claims, 21 Drawing Sheets

NON-DISRUPTIVE SEARCH FACILITY

FIELD OF INVENTION

The present invention relates generally to text or symbol search facilities within a data processing system and more particularly to a facility for displaying the result of a search without disrupting the display of the primary document.

BACKGROUND OF THE INVENTION

One of the more frequently used tools of a word processing program is the fast electronic search for a particular string of characters or symbols. This tool is typically found in one of the tool menus with the name of "FIND" or "FIND & REPLACE". Various improvements have been added to this tool over time i.e., the ability to search forward or backwards in the document, highlighting found string for easy identification, and repeating the search to find additional occurrences are some of the features that have been added to enhance the tool.

However, all known searching tools pose a significant limitation whenever the user wishes to reference some other portion of the document containing a particular string while maintaining the user's current position within the document for additional reading and/or editing. FIG. 1 depicts a conventional application window configuration 10. The application window 16 includes an identifying title block 18, which displays the name of the application 12 being used and the title of the document 14. The application toolbar 20 allows the user to edit and make changes to the document 24 and the user can "scroll" the document using the scroll bar slider 21 in the application scrollbar 22.

To better understand the conventional electronic search technology, refer now to FIG. 2, FIG. 3 and FIG. 4 together. FIG. 2 is a flowchart of how a conventional electronic search is performed. FIG. 3 represents a conventional drop down edit menu configuration. FIG. 4 represents a typical find tool dialog box configuration.

Typically, when utilizing a conventional search system from a current cursor location 126 within a document, the user activates the drop down edit menu 124 by mouse clicking the "Edit" tool 120 from the application toolbar 20, via step 102. From the drop down edit menu 124, the user activates the "find" tool 122, via step 104. Shown generally in FIG. 4 next, the conventional find tool dialog box 132 is displayed in the main application window 16, via step 106. Referring again to FIG. 4, the user then enters the search term in the "find what" area 130, via step 108. Finally, the next portion of the document containing the search term is displayed and the search term is highlighted in the main application window 16 whereby the original document orientation is disrupted, via step 110.

For a specific example of a conventional search, refer now to FIG. 5, FIG. 6, FIG. 7 and FIG. 8. FIG. 5 is a detailed flowchart of an example of a conventional search. FIG. 6 is a drop down edit menu configuration. FIG. 7 depicts a find tool dialog box configuration. FIG. 8 represents the main application window 16' after the completion of the conventional text search.

First, while reading and/or editing a document at a current location 126' in the main application window 16', the user decides to search for the string "Jepson", via step 112. Next, the user activates the drop down edit menu 124' by mouse clicking the "Edit" tool 120' from the application toolbar 20', via step 113. From the drop down edit menu 124', the user activates the "find" tool 122', via step 114. Next, the conventional find tool dialog box 132' is displayed in the main application window 16', via step 115. Next, the user enters the search term "Jepson" 134 in the "find what" area 130', via step 116. Finally, the next portion of the document containing the search term "Jepson" 138 is displayed and highlighted in the main application window 16' whereby the original document orientation is disrupted as shown by current cursor location 126", via step 117.

However, since the user can only view one portion of a document at a time in an application window, he is burdened to remember or write down the desired information from the document at the location resulting from the find operation and then return to his original location within the document. Returning to the original document location can be particularly time consuming in a large document with many pages. These problems are further compounded when a user wishes to concurrently reference multiple pieces of information residing in disparate locations within the document or residing in other files. "Cut and paste" operations are available, but frequently the user simply wishes to reference the information and has no desire to actually "paste" the information at another location in the document. Further, the loss of continuity caused by temporarily disrupting the primary viewing page can have a substantial impact on productivity and creativity.

It is desirable therefore that software applications implement an efficient and easy to use interface for displaying one or multiple portions of a document containing specified search strings while continuing to display a primary area of the document related to current reading or editing by a user. This interface should enable the user to easily display search results without disrupting the user's primary location in the document. It should provide the flexibility to place the search results in a convenient section of the computer display screen. The system should be easy to implement, cost effective and easily adaptive to existing computing systems. The present invention addresses such a need.

SUMMARY OF THE INVENTION

A method and system for displaying the results of a search operation initiated by a user is disclosed. The method and system comprise the steps of displaying a first set of information in a first window, the first window being associated with an activated application program. The method and system further comprise initiating a first search based upon a user interaction with the application program and displaying the results of the search in a second window wherein the first window continues to display the first set of information.

Through the use of a system and method in accordance with the present invention, a user can view one or more portions of a document containing specified search strings while continuing to view the primary area of the document where reading and/or editing is occurring. Furthermore, the user can create, move, or resize these variable sized find windows by commonly known mouse operations. Further still, the user can display search results from files or documents that are different from the primary document.

DETAILED DESCRIPTION OF THE INVENTION

The present invention provides a method and system for displaying the result of a search without disrupting the original location within the primary document. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments shown but is to be accorded the widest scope consistent with the principles and features described herein.

Figure 1:
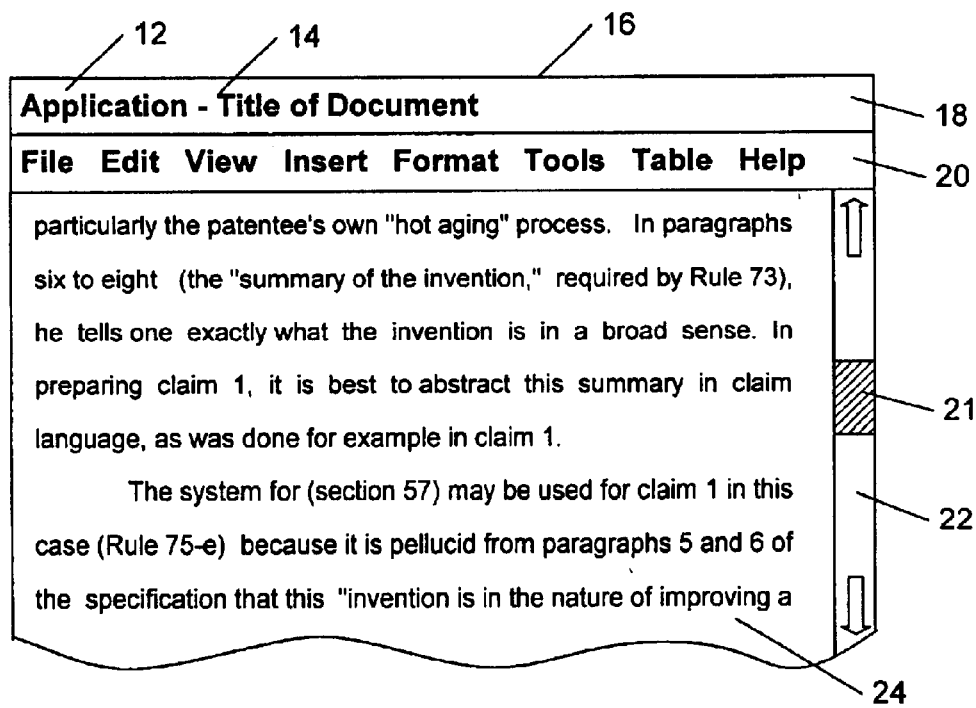
FIG. 1 shows a conventional application window configuration.
Figure 2:
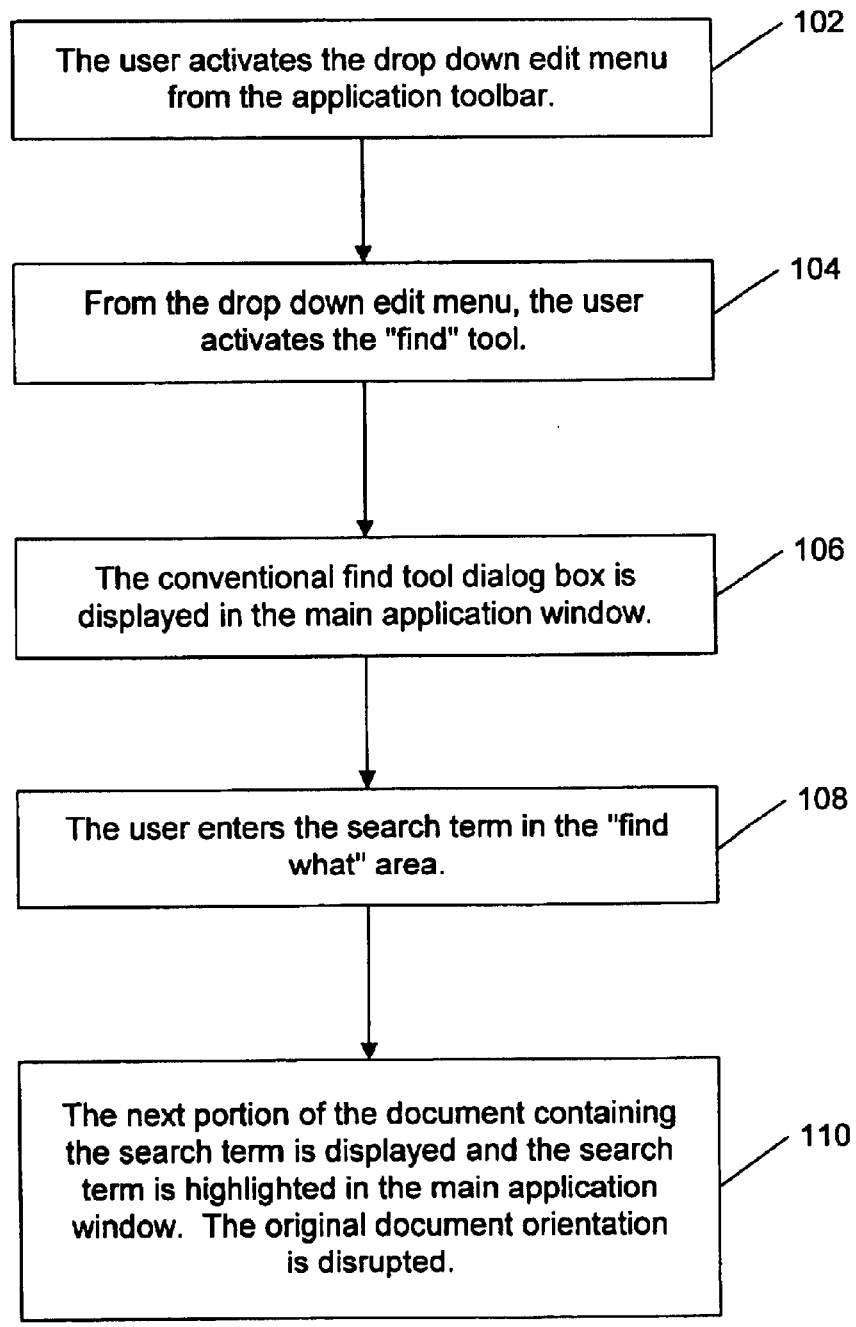
FIG. 2 is a flowchart of a conventional method of utilizing an application "find" tool.
Figure 3:
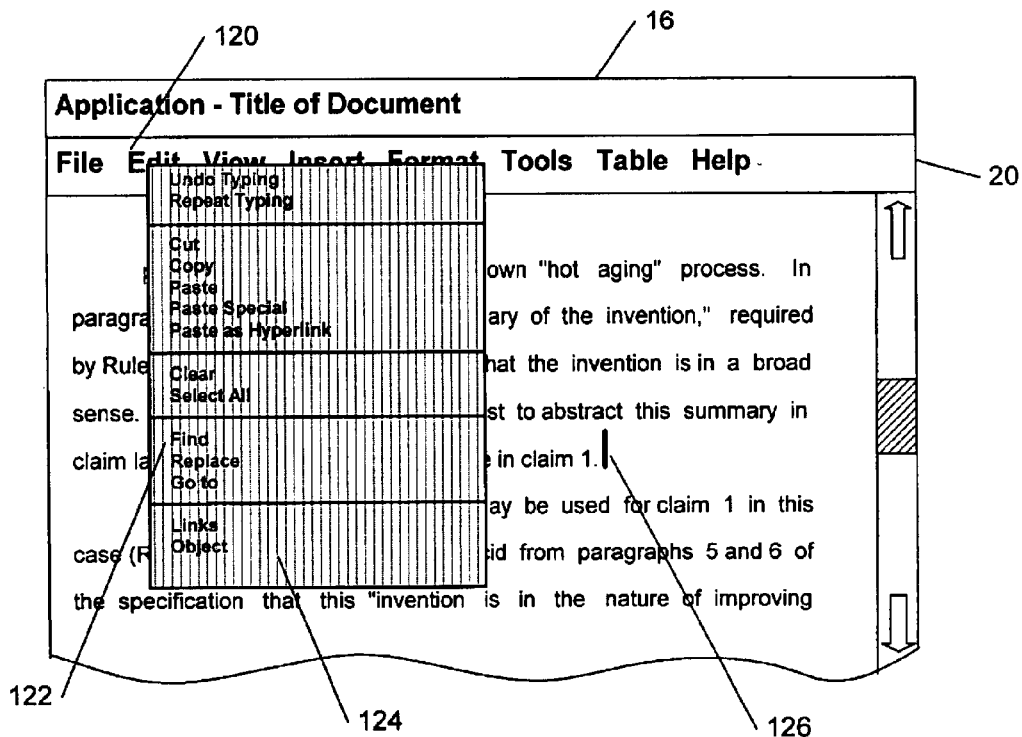
FIG. 3 shows a conventional drop down edit menu configuration.
Figure 4:
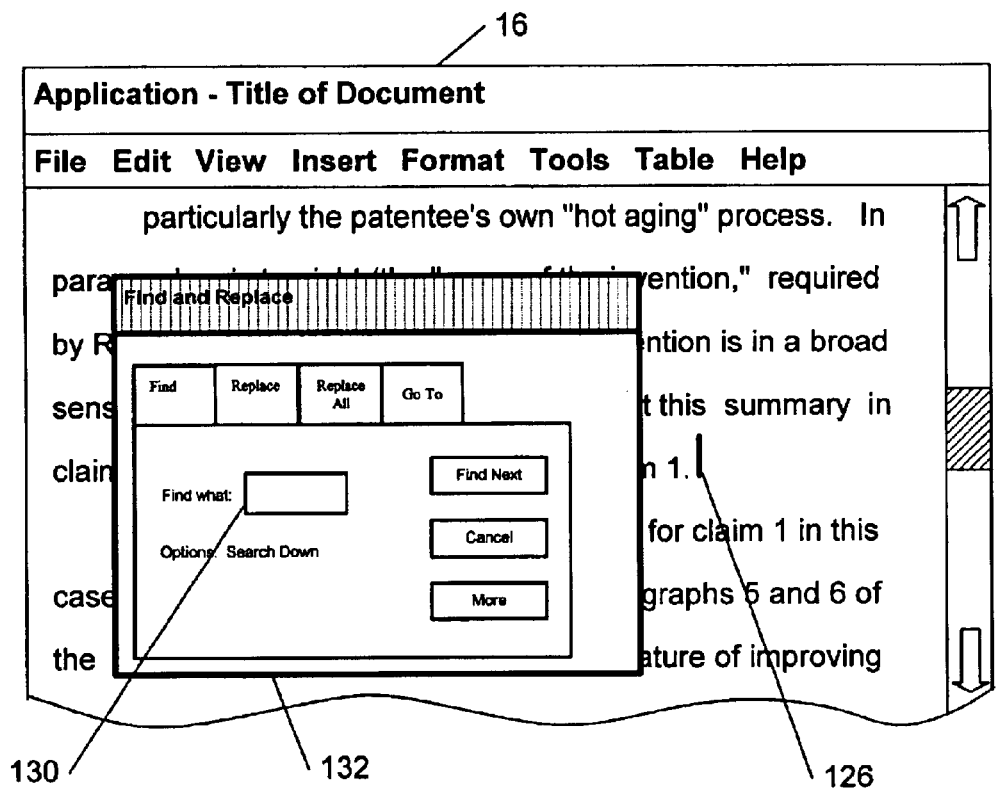
FIG. 4 shows a typical find tool dialog box configuration.
Figure 5:
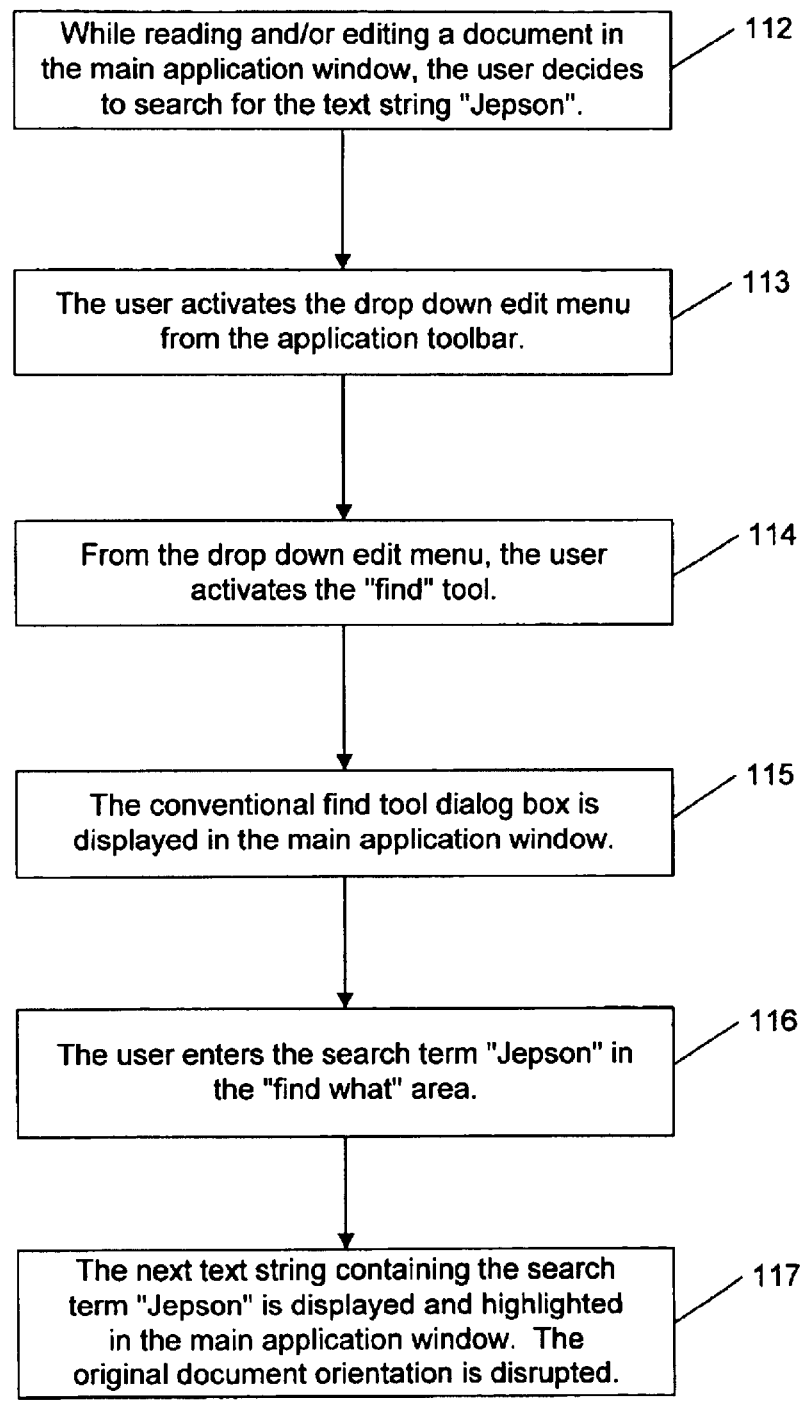
FIG. 5 is a flowchart of an example of a conventional method of utilizing a "find" tool.
Figure 6:
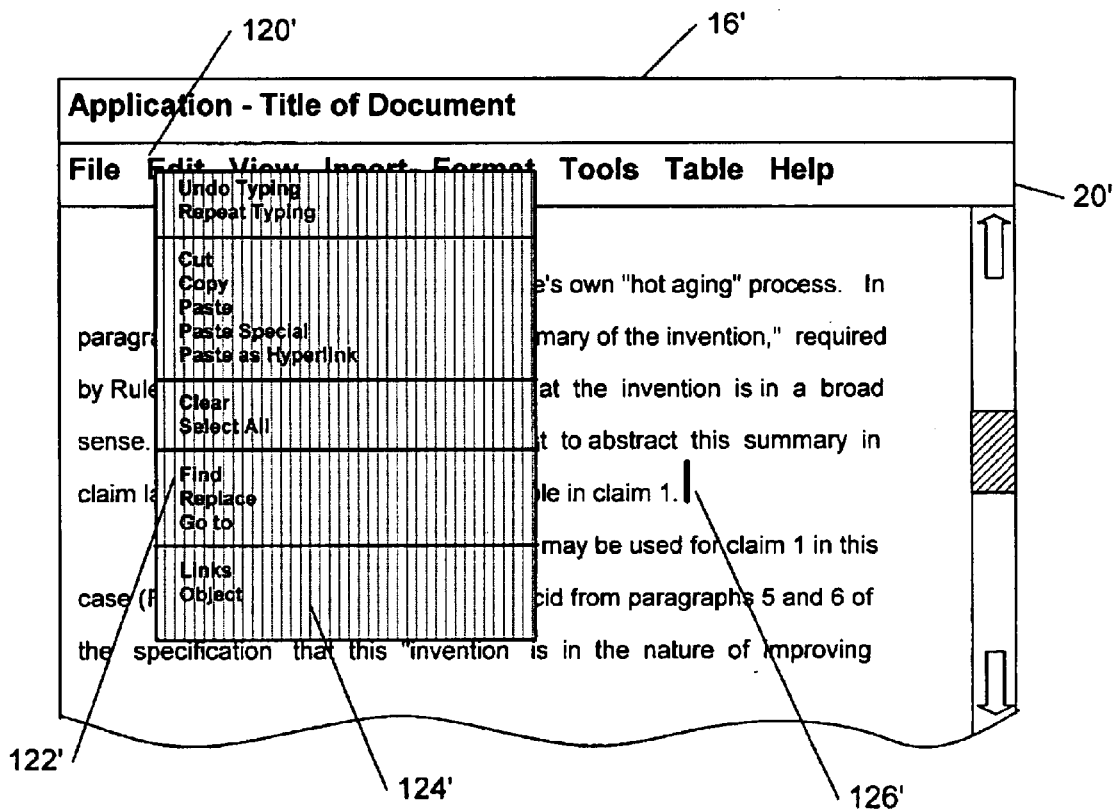
FIG. 6 shows an example of a conventional drop down edit menu configuration.
Figure 7:
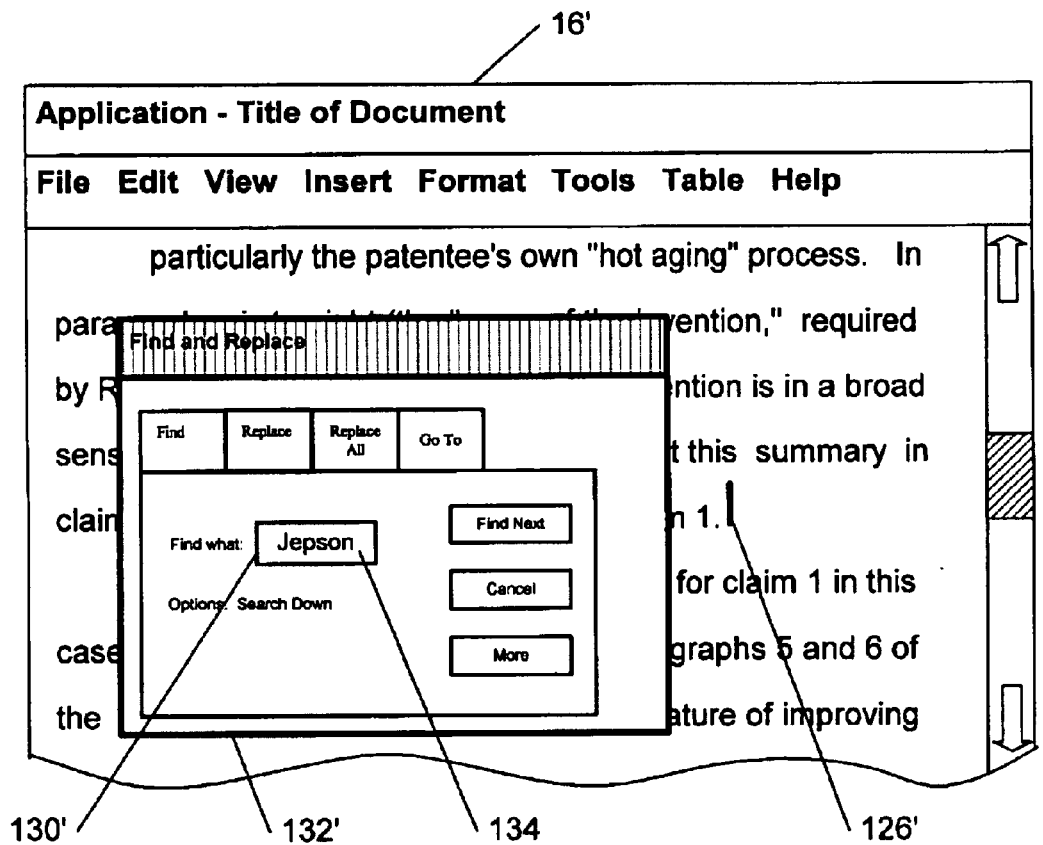
FIG. 7 is an example of a find tool dialog box configuration.
Figure 8:
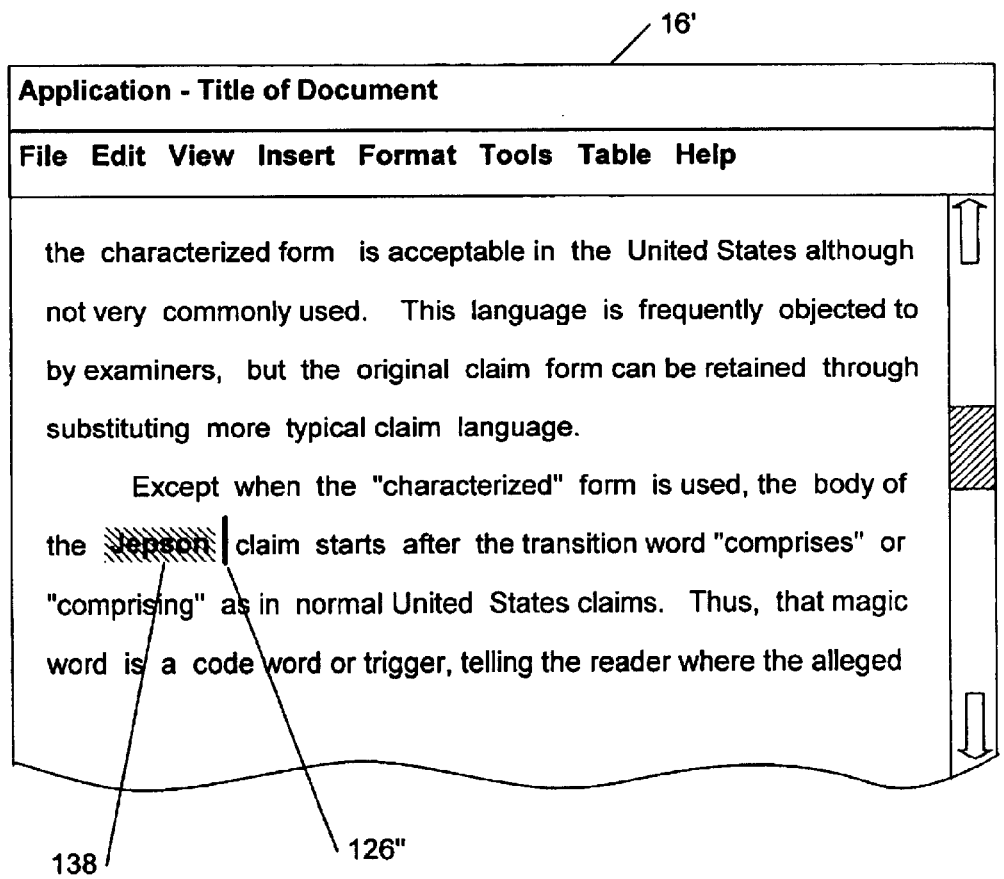
FIG. 8 shows a main application window after the completion of a conventional text search causing disruption of the original orientation of the document.
Figure 9:
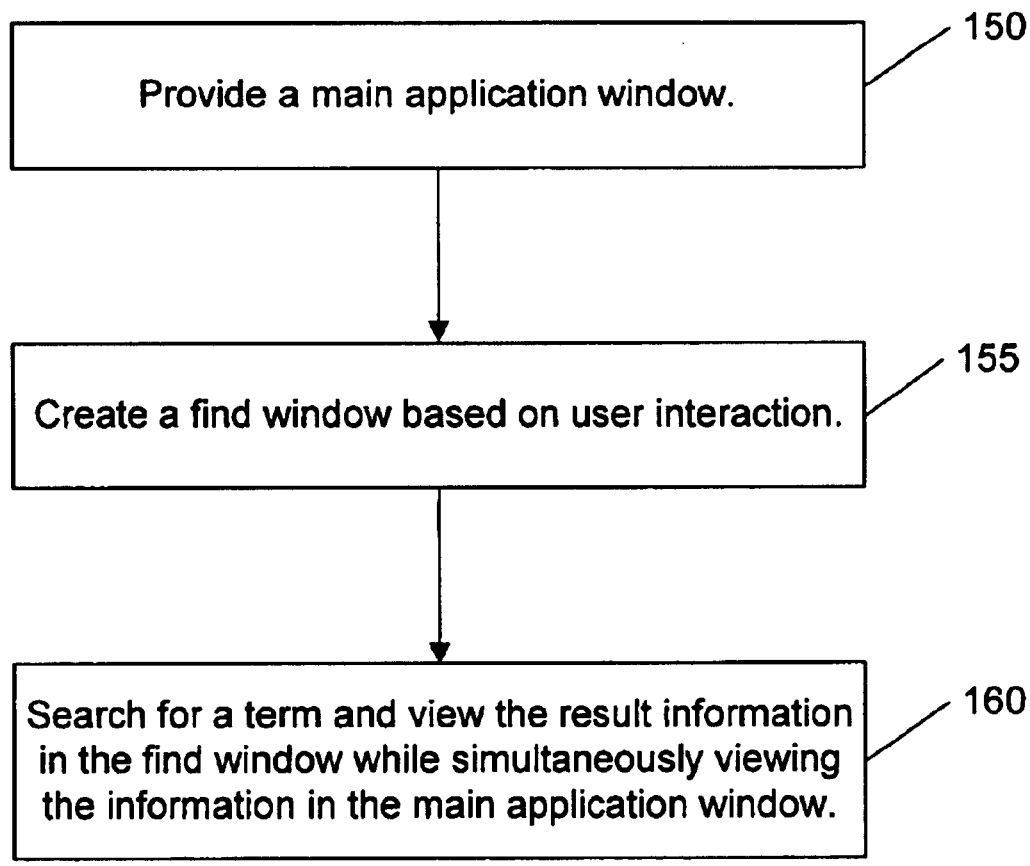
FIG. 9 is a flowchart of the operation of the method in accordance with the present invention.

To more particularly describe the method and system in accordance with the present invention, FIG. 9 is a simple flowchart of a method in accordance with the present invention. First, a main application window is provided, via step 150. Next, a find window is created based on a user interaction, via step 155. The user can search for a term and view the results in the find window while simultaneously viewing the information in the main application window, via step 160. The results of the search and surrounding text are displayed in the find window. Through the use of a system and method in accordance with the present invention, a user can view one or more portions of a document containing specified search strings in the find window while continuing to view the primary area of the document in the main application window where reading and/or editing is occurring. Furthermore, the user can create, move, or resize these variable sized find windows by commonly known mouse operations.

Figure 10:
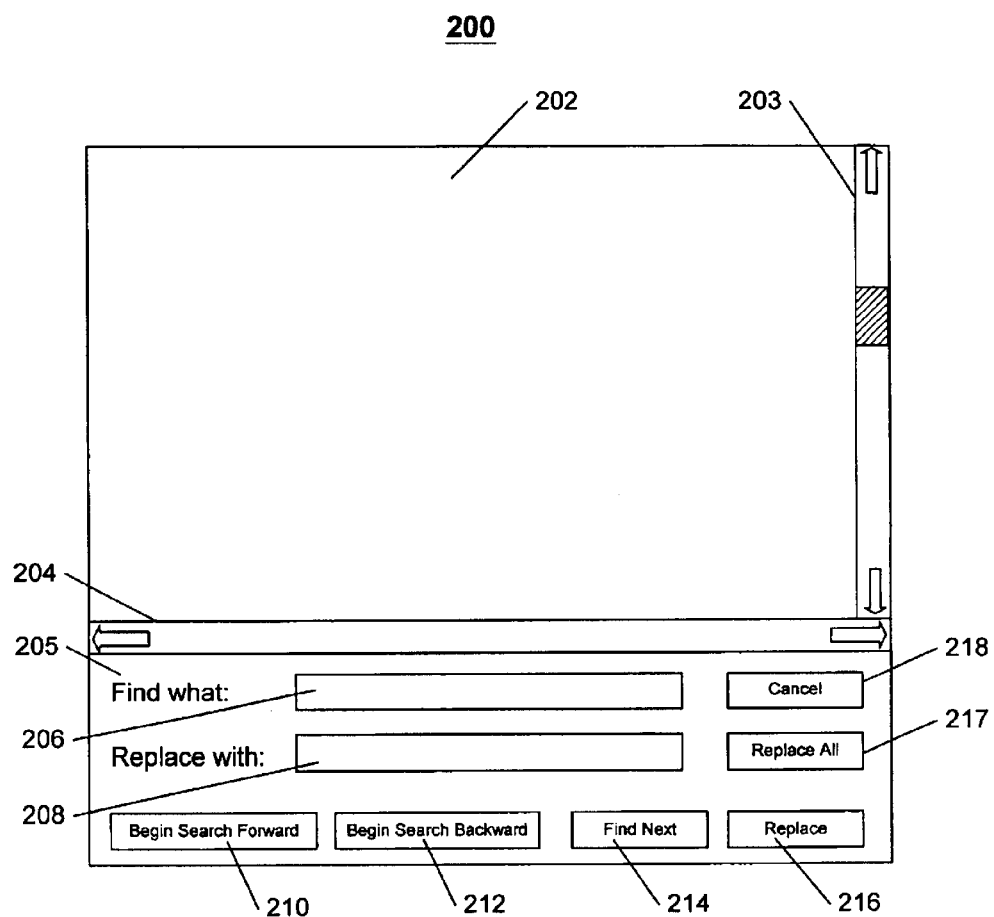
FIG. 10 shows a preferred embodiment of a find window in accordance with the present invention.

A method and system in accordance with the present invention is disclosed in the context of a preferred embodiment. The preferred embodiment allows for the creation of variable sized find windows that can be viewed simultaneously with the primary area of the document that is being read and/or edited in the main application window. FIG. 10 depicts a find window 200. The find window 200 includes an upper results area 202 for the display of information associated with the results of a search, a vertical scrollbar 203, a horizontal scrollbar 204, and a lower area 205 for user interaction with the application program. This lower rectangular area 205 includes an area for entering a search argument 206 and a plurality of user interaction buttons, 210, 212, 214, 216, 217, 218. In a preferred embodiment, the plurality of user interaction buttons includes a "begin search forward" button 210, a "begin search backward" button 212, a "find next" button 214, a "replace" button 216, a "replace all" button 217, and a "cancel" button 218. A replacement area 208 allows the user to enter a replacement string and direct the application to replace the found string with the replacement string.

Although the find windows depicted are rectangular in shape, one of ordinary skill in the art will readily recognize that a variety of shapes could be utilized while remaining within the spirit and scope of the present invention.

Figure 11:
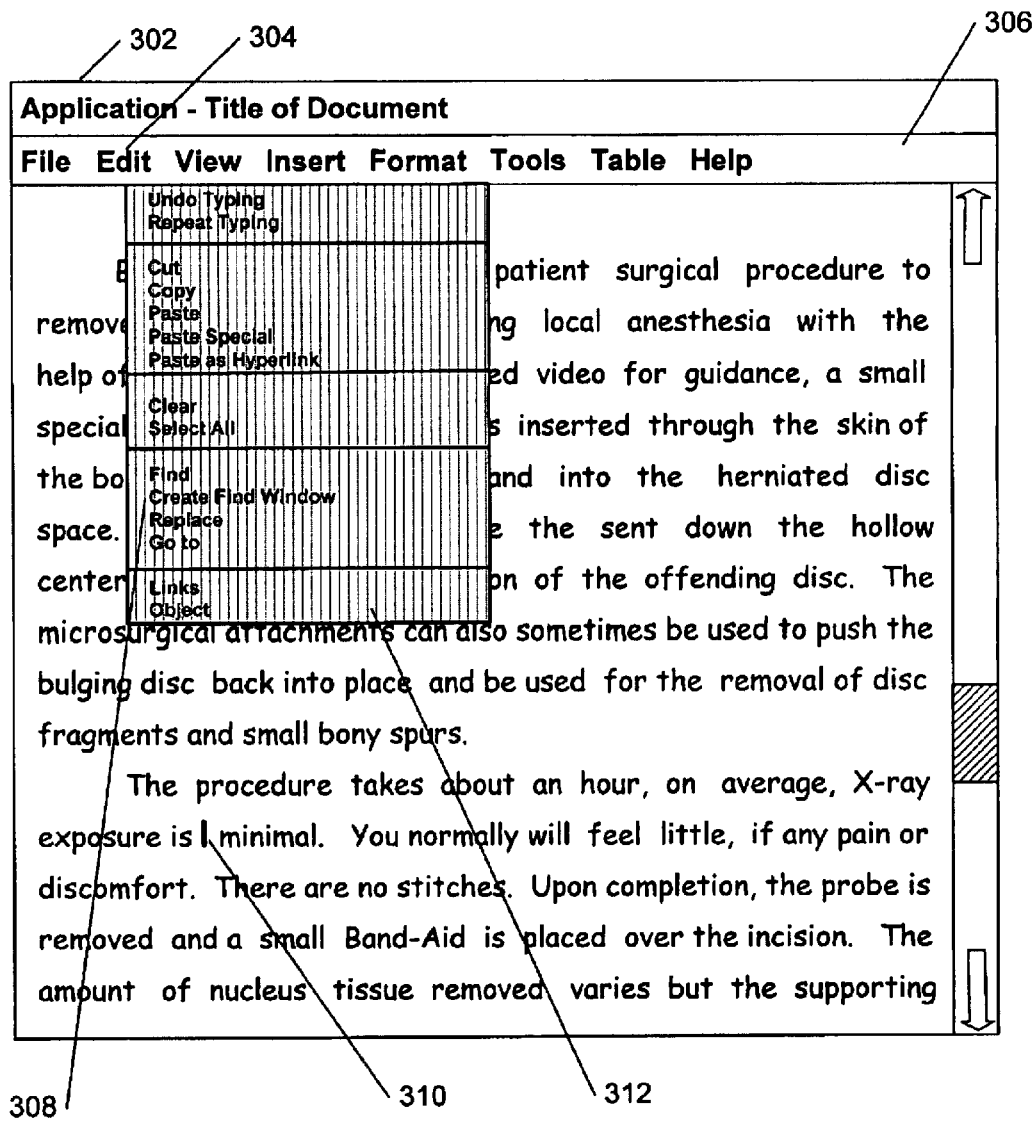
FIG. 11 shows a drop down edit menu configuration in accordance with the present invention.
Figure 12:
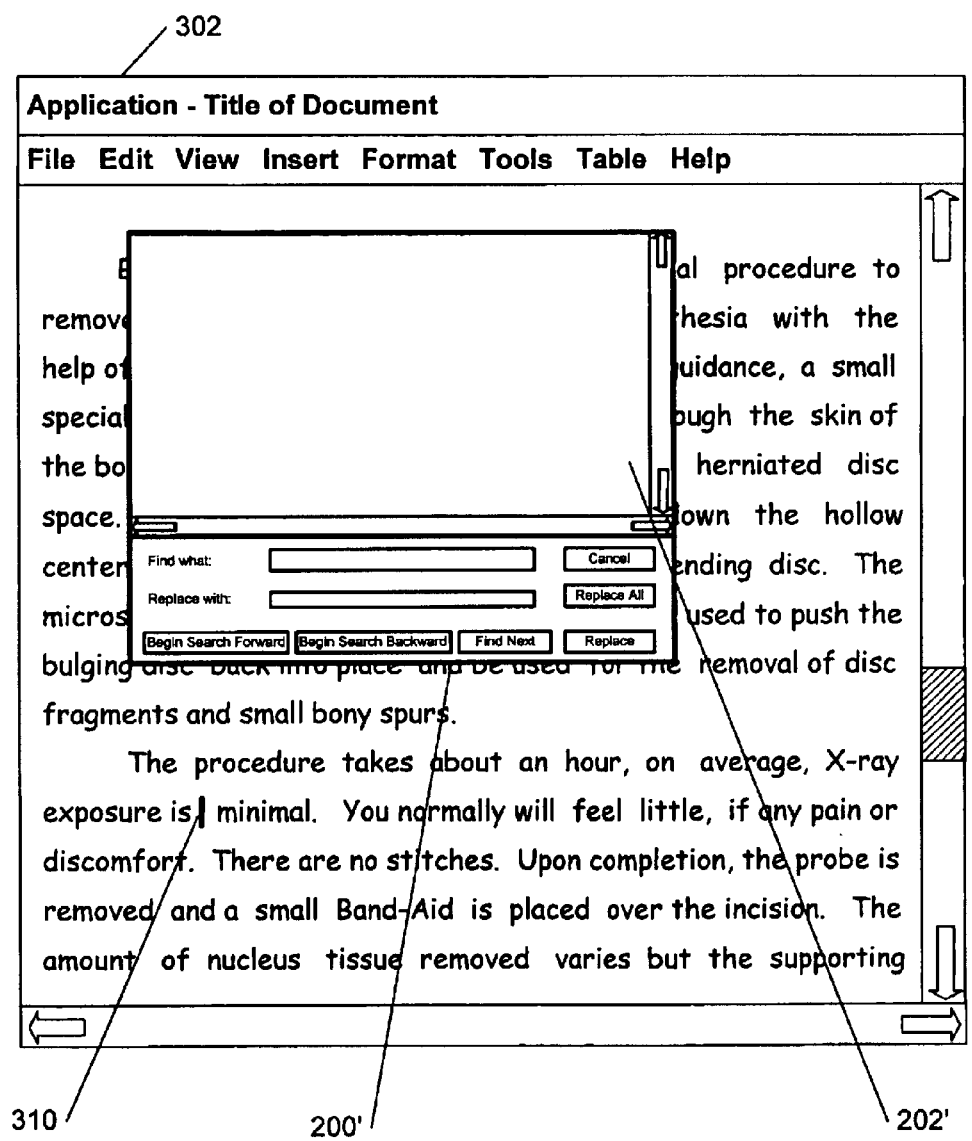
FIG. 12 shows a find window configuration in conjunction with an application window in accordance with the present invention.

To more specifically describe the method and system of the present invention refer now to the following detailed description of a preferred embodiment of a system in accordance with the present invention along with accompanying FIG. 11 and FIG. 12.

FIG. 11 depicts a drop down edit menu configuration 300 in accordance with the present invention. From the current document position 310, the drop down edit menu 312 is activated from the main application window 302 by mouse clicking the "edit" tool 304 from the application toolbar 306. The drop down menu in accordance with the present invention includes the "create find window" tool 308.

FIG. 12 depicts a find window configuration 400 in accordance with the present invention. The user can simultaneously view the find window 200' and a portion of the document in the main application window 302. The document location 310 does not change as a result of the search.

Figure 13:
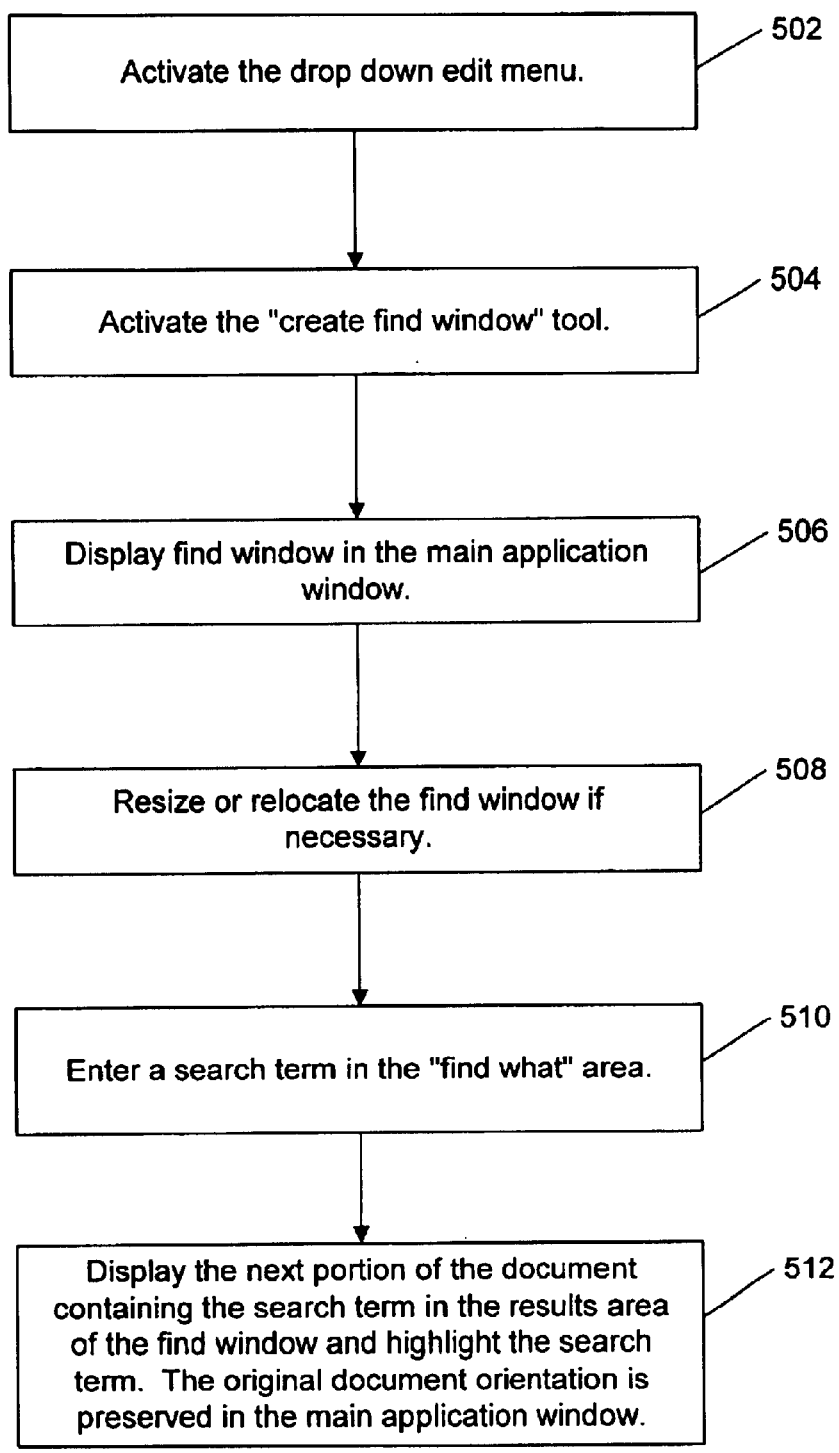
FIG. 13 is a flowchart of the operation of the method in accordance with the present invention.

To more fully describe the operation of the present invention in the context of the preferred embodiment, refer to FIG. 13 which is a detailed flowchart 500 of a method accordance with the present invention. While reading and/or editing a document at a current location in the main application window, the user activates the drop down edit menu by mouse clicking the "Edit" tool from the application toolbar, via step 502. From the drop down edit menu, the user activates the "create find window" tool, via step 504. Next, the find window is displayed in the main application window, via step 506. The user can then resize or relocate the find window if necessary, via step 508. Next, the user enters the search term in the "find what" area, via step 510. The next portion of the document containing the search term (the results of the search), is displayed in the results area of the find window and the search term is highlighted, via step 512. Note that the original document orientation is preserved in the main application window. Accordingly, the system and method in accordance with the present invention allows the user to view and edit information at the current location within the main application window while simultaneously viewing information resulting from the search within the find window. The amount of text displayed in the results area in addition to the search term may depend upon the size of the find window. The location of the search term within the results area may also be varied.

Figure 14:
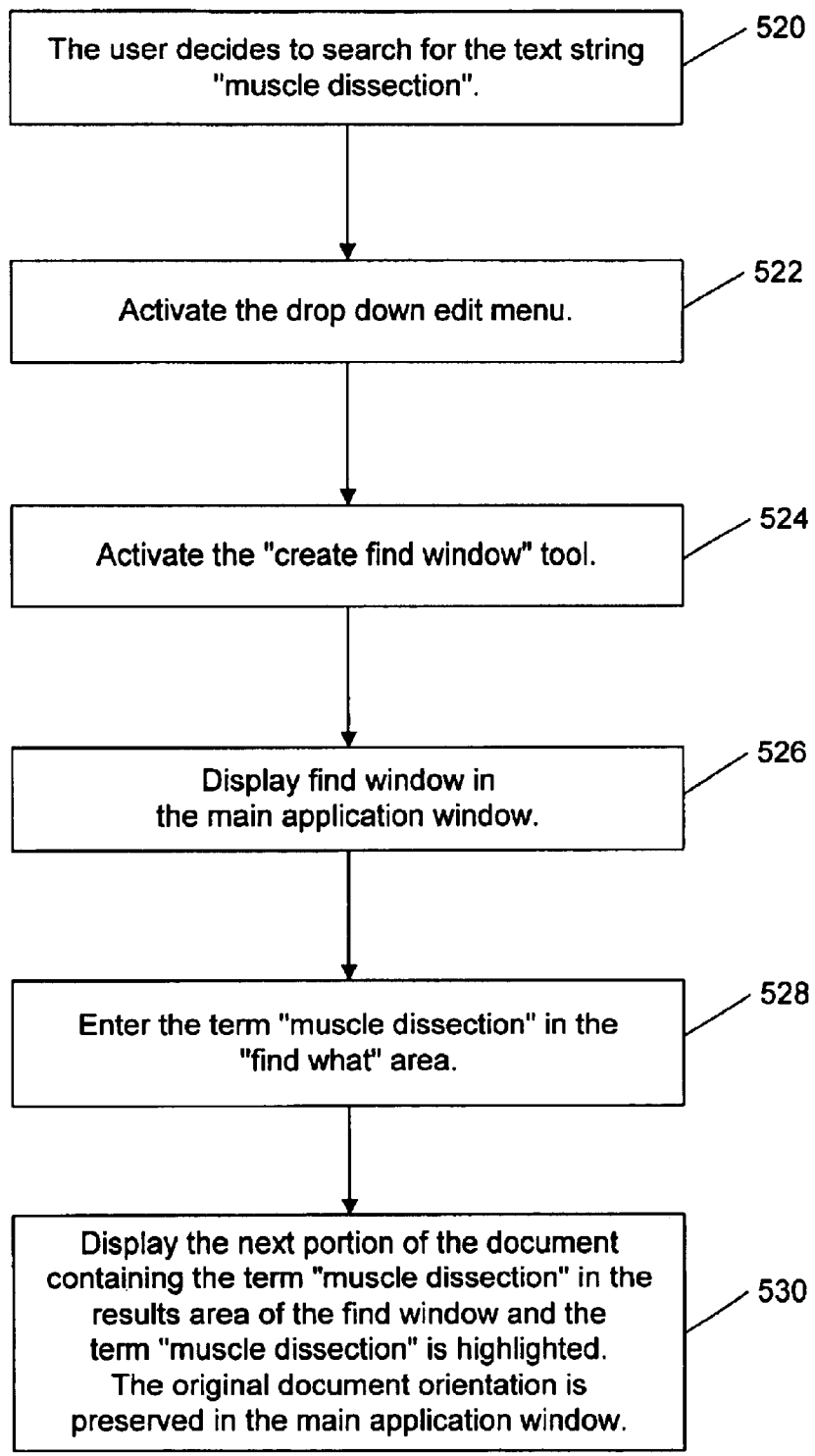
FIG. 14 is a flowchart of an example of the operation of the method in accordance with the present invention.
Figure 15:
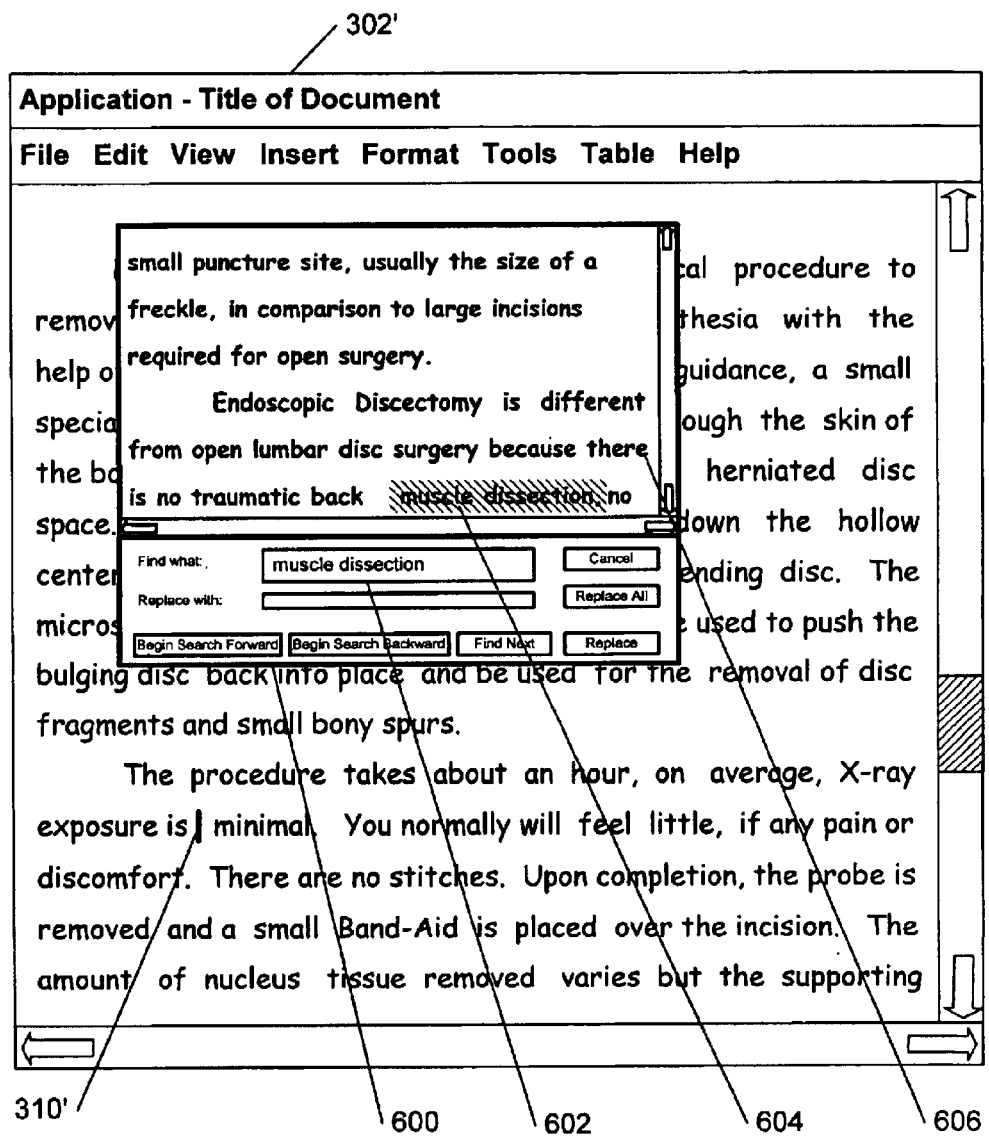
FIG. 15 shows an example of a find window configuration in accordance with the present invention.

To more fully describe the operation of the present invention in the context of the preferred embodiment, FIG. 14 is a detailed flowchart of an example of the method in accordance with the present invention, FIG. 15 depicts an example of a find window configuration in accordance with the present invention.

Referring to FIG. 14 and FIG. 15 together, while the user is reading and/or editing the document at a current location 310' in the main application window 302', the user decides to search for the string "muscle dissection", via step 520. The user then activates the drop down edit menu by mouse clicking the "Edit" tool from the application toolbar, via step 522. From the drop down edit menu, the user activates the "create find window" tool, via step 524. Next, a find window 600 is displayed in the main application window 302', via step 526. Next, the user enters the term "muscle dissection" 602 in the "find what" area, via step 528. The next portion of the document containing the term "muscle dissection" is displayed in the results area 606 of the find window 600 and the term "muscle dissection" is highlighted 604, via step 530. Note that the original document location 310' is preserved in the main application window. Accordingly, the system in accordance with the present invention allows the user to view and edit text at the current location within the main application window while simultaneously viewing text resulting from the "muscle dissection" search within the find window.

In a preferred embodiment of a system and method in accordance with the present invention, the document position within the word processing application remains unchanged during the text searching operations. The paragraph or paragraphs of interest currently being displayed by the main application window 302' continue to be displayed. Once the needed information is displayed in the find window 600, the user may instantly return to his reading and/or editing at the original location 310' within the document while simultaneously viewing the needed information in the find window 600. The user's work flow is never disrupted since the same document text is continuously displayed in the main application window 302' throughout the text search process. Furthermore, the location 310' within the document associated with the user's primary reading and/or editing activities remains unchanged.

Figure 16:
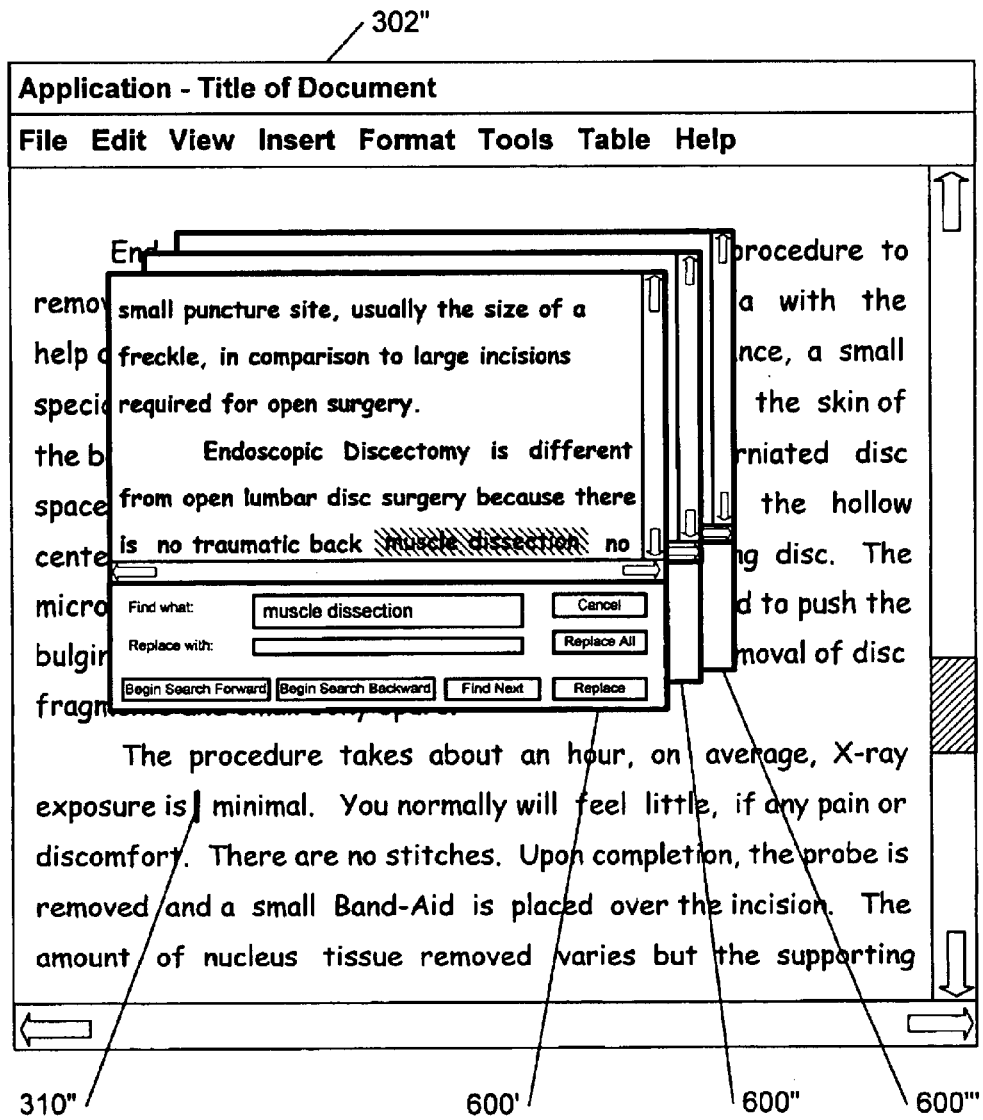
FIG. 16 shows an example of multiple find window configurations in accordance with the present invention.

FIG. 16 illustrates another embodiment of the system and method in accordance with the present invention. In the embodiment of FIG. 16, the user has the ability to activate a plurality of find windows 600', 600'', 600'''. Each of the plurality of find windows 600', 600'', 600''', can be created by one of two methods. First, a subsequent find window can be created by activating the "create find window" tool again. The same or new search term could be entered for this window.

Figure 16A:
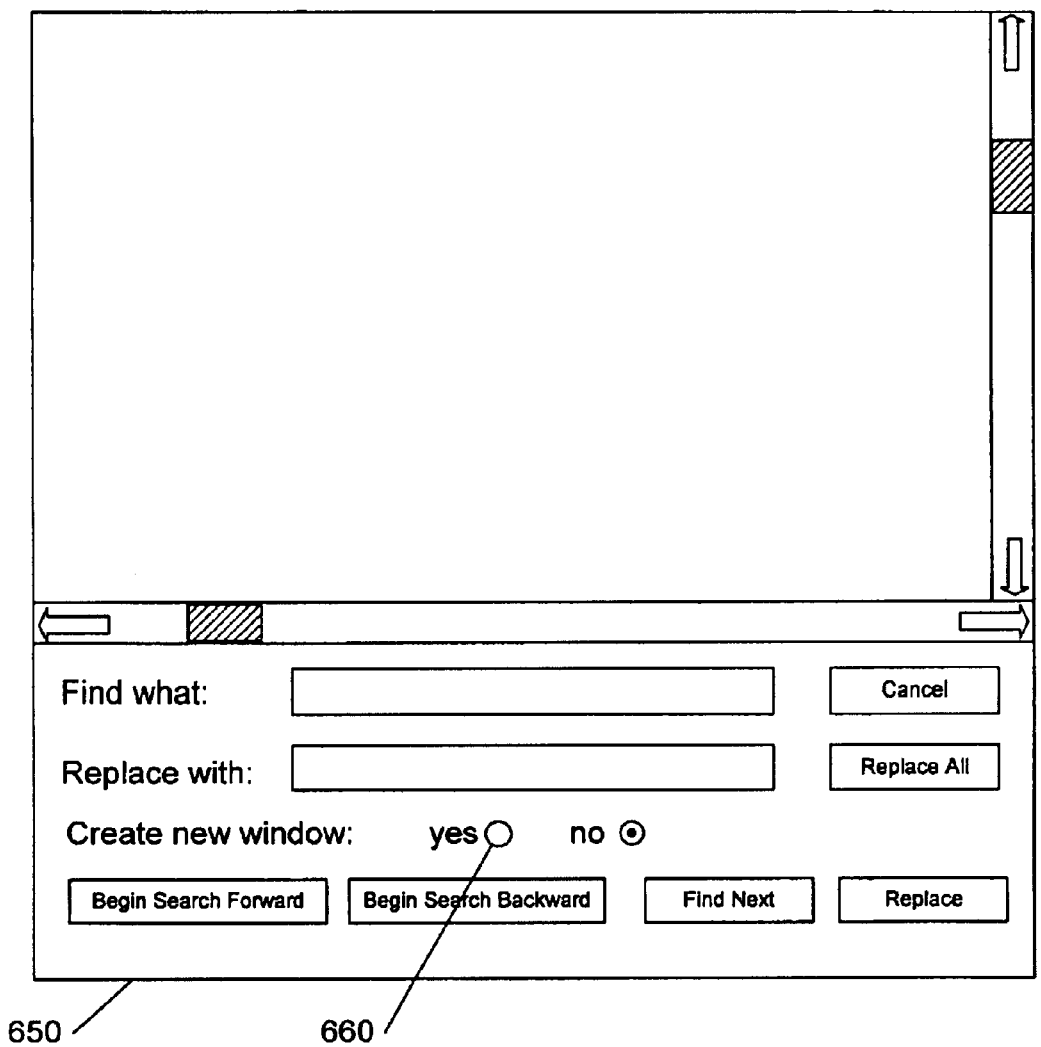
FIG. 16a shows another embodiment of a find window in accordance with the present invention.

FIG. 16a illustrates a second method of creating a subsequent find window 650. This method involves the implementation of a "yes" radio button 660 wherein the subsequent find window can preferably be created by selecting the "yes" button 660. This directs the system to automatically create a new find window to contain the results of the next search operation initiated from the current find window, so as not to destroy the results of the previous search displayed in the current find window.

Figure 17:
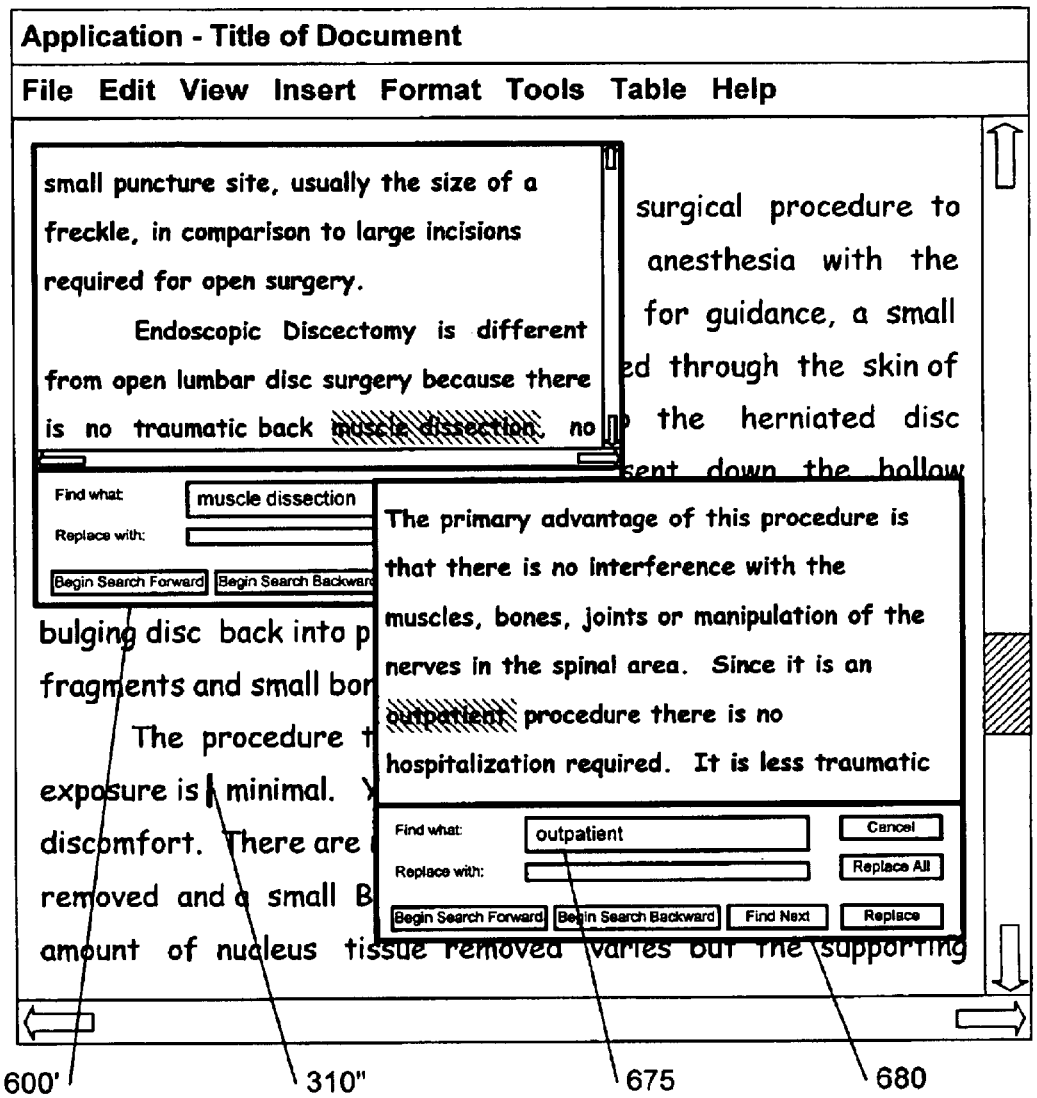
FIG. 17 illustrates concurrent usage of multiple find windows in a system in accordance with the present invention.

FIG. 17 illustrates the simultaneous display of the find window 600', which was based on the search term "muscle dissection", and the find window 680 which is based on the search term "outpatient" 675. In either case, this particular embodiment of the system and method in accordance with the present invention allows a plurality of find windows to simultaneously display the needed reference information from other portions of the document while reading and/or editing continues at the same location in the main application window.

Figure 18:
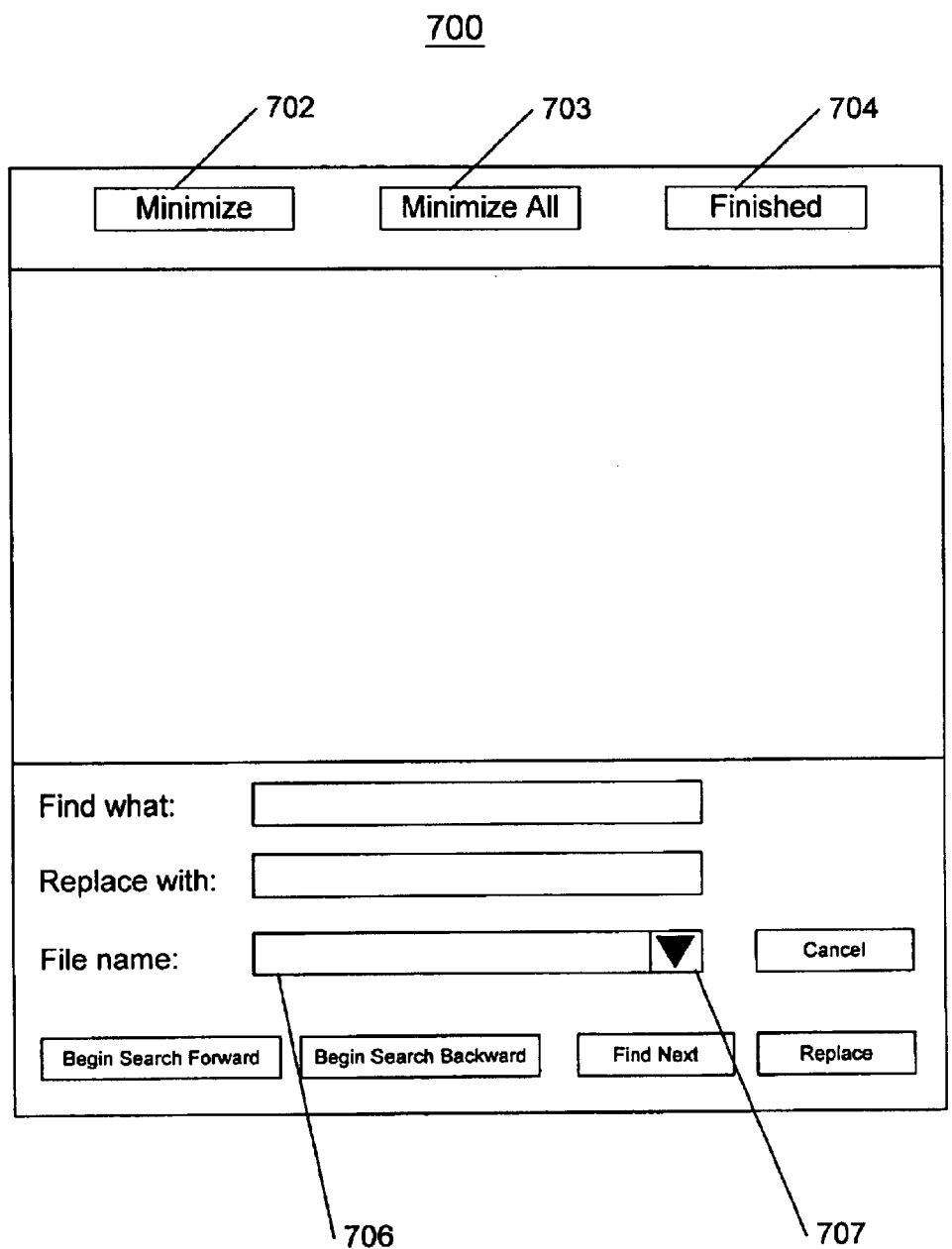
FIG. 18 is another embodiment of a find window in accordance with the present invention.

FIG. 18 illustrates yet another embodiment of the system and method in accordance with the present invention. Here, the find window 700 incorporates a "minimize" button 702 which allows the user to make the find window 700 temporarily invisible preferably reducing it to an icon in the operating system taskbar, for a full and unobstructed view of the document in the main application window. By clicking the icon in the taskbar, the find window 700 is toggled back to the visible state. A related "minimize all" button 703, preferably makes all find window temporarily invisible preferably by reducing them to an icon in the taskbar. Again by clicking this icon, all the find windows are toggled back to the visible state. The find window 700 also incorporates a cancel button 218' wherein the selection of the cancel button 218' deletes the find window 700. In like manner to the "minimize all" button 703, the selection of the "cancel all" button 704 deletes all the find windows.

Find window 700 also incorporates a "file name" area 706. Preferably, this area allows the user to enter information that defines the scope of additional files to be searched.

For example, the user could enter the name of a directory. In this case, every file contained in the named directory will be searched for occurrences of the specified search term. In addition, the user can specify that multiple directories are to be searched by using "wild cards" in the directory name. For example, if the "c:" drive contains four directories named "EASY", "EAST", "EARTH", and "EMPTY", the user can specify "C:\EA*" to include EASY, EAST, and EARTH directories in the search, excluding directory EMPTY. In this case, all files contained in the directories EASY, EAST, and EARTH will be searched for occurrences of the specified search term. Preferably, the filename area 706 incorporates a drop down button 707 which when depressed displays the files containing the search term by utilizing a conventional "drop down list" configuration.

Figure 19:
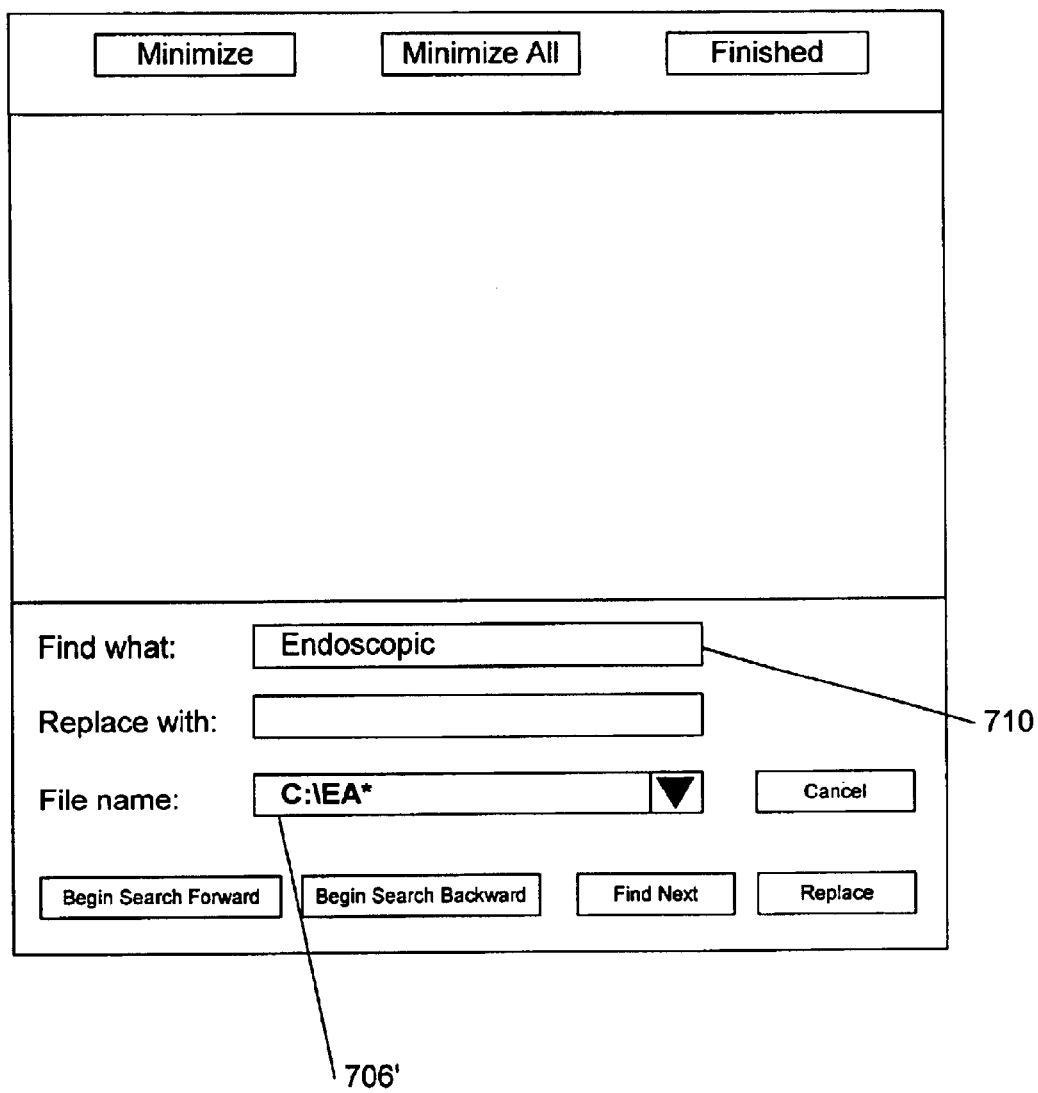
FIG. 19 shows a drop down list configuration in accordance with the present invention.

FIG. 19 shows a drop down list configuration in accordance with the present invention. Using the example from above, the user enters "C:\EA*" in the drop down list window 706'. Next, the user enters the search term "Endoscopic" in the Find What Area 710. This results in searching files within directories "EASY", "EAST" and "EARTH" for occurrences of the search term "Endoscopic".

Figure 19A:
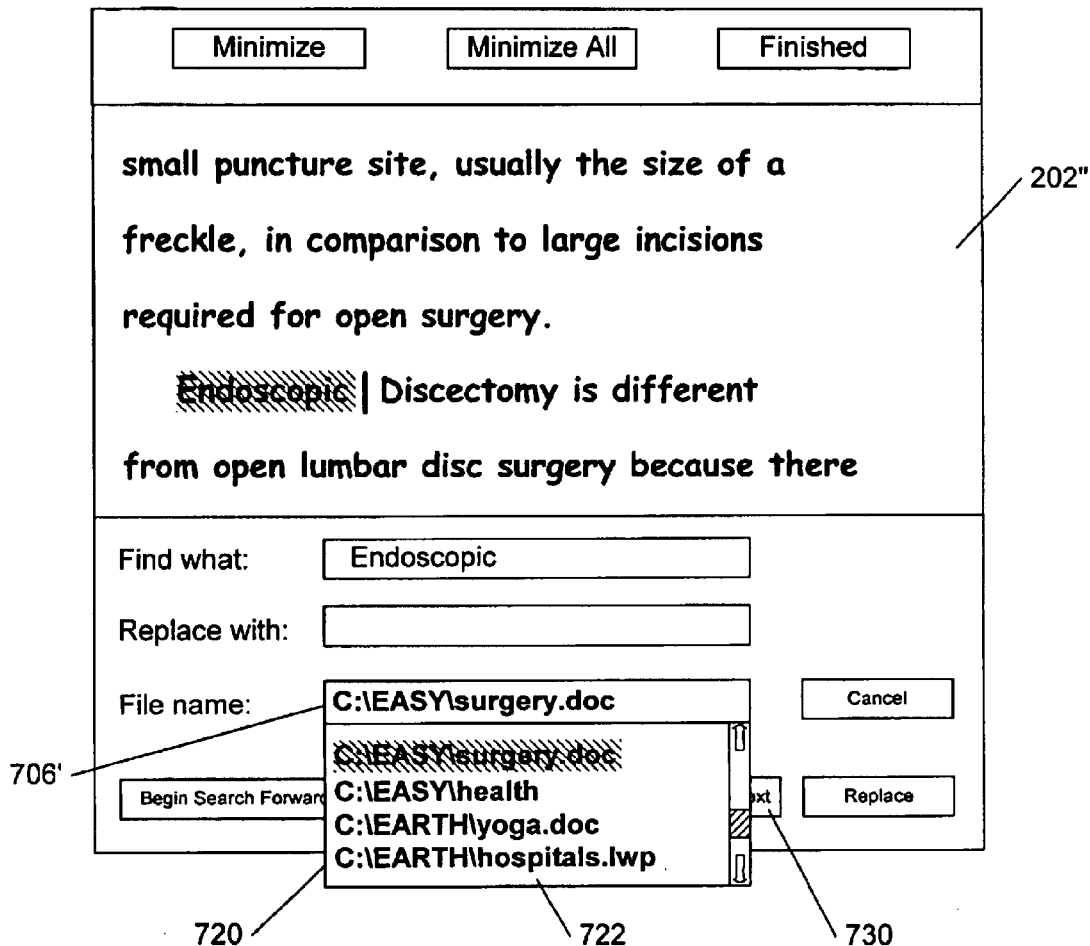
FIG. 19a shows search results in accordance with the present invention.

Referring now to FIG. 19a, the user expands the drop down list 720 to view the list of files 722 containing the search term "Endoscopic". The files are preferably listed in the order in which the files were created. The search results area 202'' displays a portion of a file containing the first occurance of the search term. This file is preferably the first file from the drop down list, which is the list of all files within the scope of the search that contains one or more occurrences of the search term. Note the current file associated with the search results is highlighted.

The user may select the highlighted first file, or any other file from the list. Upon making a selection, the drop down list collapses and the selected file is displayed in the file name area 706'. Whenever the drop down list window is expanded, the current file associated with the search result is highlighted within the list of files. Whenever a new file is selected from the drop down list, the results area is updated to display the corresponding portion of the file that contains the first occurance of the search term.

Moreover, once the final occurrence of the search term has been reached in the selected file, a subsequent activation of the find next button 730 displays the first occurrence of the search term in the next file containing the search term.

Also, in addition to the directory name, the user may also specify a file name, with or without wild cards, to be searched. In this case, only the specified file or files will be searched in the specified directories. This function provides for obtaining search results from sources of information beyond the scope of the current document in the main application window, without disrupting the reading or editing of the primary document by the user.

ADVANTAGES

The system and method in accordance with the present invention allows the user to view the results of a search while reading and/or editing a document in the main application window without losing his position in the document. This is distinguishable from the conventional methodology in that it doesn't require the user to toggle back and forth to different positions within a document to obtain search results. Accordingly, the user will not lose continuity while editing and/or reviewing documents nor will the user be burdened to find his previous location when performing search operations. Therefore, higher levels of productivity and creativity will result from the use thereof.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for displaying the results of a find character string function within a document, comprising the steps of:
   a) displaying a first set of text in a first document in a first window, the first window being associated with an activated application program;
   b) creating a second window to initiate the find character string function based on a first user interaction with the application program;
   c) initiating a first search within the first document in the second window; and
   d) displaying the results of the first search in context with a copy of the first document in the second window, wherein the first window continues to display the first set of text in the first document.

2. The method of claim 1 wherein the first set of text in the first document is obscured by the second window.

3. The method of claim 2 wherein the first set of text in the first document is partially obscured by the second window.

4. The method of claim 1 further comprising the steps of:
   e) initiating a second search within the first document based upon a second user interaction with the application program; and
   f) displaying the results of the second search in a third window wherein the first window continues to display the first set of text in the first document and the second window continues to display the first search results.

5. The method of claim 4 wherein the second and the third window can be minimized by selecting an action available from the second window.

6. The method of claim 4 wherein the results of the first search can be viewed simultaneously with the results of the second search by a user.

7. The method of claim 4 wherein the second user interaction includes utilization of a user interaction area within the second window.

8. The method of claim 4 wherein the results of the second search are displayed in the context of text in the first document.

9. The method of claim 1 wherein the results of the first search in the second window includes highlighted symbols corresponding to a search criteria of the first search.

10. The method of claim 1 wherein the first set of text in the first document can be viewed simultaneously with the results of the first search by a user.

11. The method of claim 1, wherein said first search was performed within a second document in the second window and said results were displayed in context with a copy of the second document in the second window, wherein the first window continues to display the first set of text in the first document.

12. The method of claim 1 wherein the activated application program is a word processing program.

13. The method of claim 1 further comprising the steps of:
   e) initiating a second search within a second document based upon a second user interaction with the application program; and
   f) displaying the results of the second search in a third window wherein the first window continues to display the first set of text in the first document and the second window continues to display the first search results.

14. A computer readable medium containing program instructions for displaying the results of a find character string function within a document, the program instructions comprising instructions for:
   a) displaying a first set of text in a first document in a first window, the first window being associated with an activated application program;
   b) creating a second window to initiate the find character string function based on a first user interaction with the application program;
   c) initiating a first search within the first document in the second window; and
   d) displaying the results of the first search in context with a copy of the first document in the second window, wherein the first window continues to display the first set of text in the first document.

15. The computer readable medium of claim 14 further comprising the steps of:
   (e) initiating a second search within the first document based upon a second user interaction with the application program; and
   (f) displaying the results of the second search in the third window, wherein the first window continues to display the first set of text in the first document and the second window continues to display the first search results.

16. The computer readable medium of claim 15 wherein the results of the first search can be viewed simultaneously with the results of the second search by a user.

17. The computer readable medium of claim 15 wherein the user interaction includes utilization of a second user interaction area within the second window.

18. The computer readable medium of claim 14 wherein the second and the third window can be minimized by selecting an action available from the second window.

19. The method of claim 15 wherein the results of the second search are displayed in the context of text in the first document.

20. The computer readable medium of claim 14 wherein the first set of text in the first document is obscured by the second window.

21. The computer readable medium of claim 20 wherein the first set of text in the first document is partially obscured by the second window.

22. The computer readable medium of claim 11, wherein said first search was performed within a second document in the second window and said results were displayed in context with a copy of the second document in the second window, wherein the first window continues to display the first set of text in the first document.

23. The computer readable medium of claim 14 further comprising the steps of:
   (e) initiating a second search within a second document based upon a second user interaction with the application program; and
   (f) displaying the results of the second search in the third window, wherein the first window continues to display the first set of text in the first document and the second window continues to display the first search results.

24. The method of claim 14 wherein the activated application program is a word processing program.

25. The computer readable medium of claim 14 wherein the results of the first search in the second window includes highlighted symbols corresponding to a search criteria of the first search.

26. The computer readable medium of claim 14 wherein the first set of text in the first document can be viewed simultaneously with the results of the first search by a user.

27. A system for displaying the results of a find character string function within a document, the system comprising:
   a) means for displaying a first set of text in a first document in a first window, the first window being associated with an activated application program;
   b) means for creating a second window to initiate the find character string function based on a first user interaction with the application program;
   c) means for initiating a first search within the first document in the second window; and
   d) means for displaying the results of the first search in context with a copy of the first document in the second window, wherein the first window continues to display the first set of text in the first document.

28. The system of claim 27 further comprising:
   e) means for initiating a second search within the first document based upon a second user interaction with the application program; and
   f) means for displaying the results of the second search in the third window wherein the first window continues to display the first set of text in the first document and the second window continues to display the first search results.

29. The system of claim 28 wherein the results of the first search can be viewed simultaneously with the results of the second search by a user.

30. The system of claim 28 wherein the second user interaction includes utilization of a user interaction area within the second window.

31. The system of claim 28 wherein the second and the third window can be minimized by selecting an action available from the second window.

32. The method of claim 28 wherein the results of the second search are displayed in the context of text in the first document.

33. The system of claim 27 wherein the first set of text in the first document is obscured by the second window.

34. The system of claim 33 wherein the first set of text in the first document is partially obscured by the second window.

35. The system of claim 27 wherein the first set of text in the first document can be viewed simultaneously with the results of the first search by a user.

36. The system of claim 27, wherein said first search was performed within a second document in the second window and said results were displayed in context with a copy of the second document in the second window, wherein the first window continues to display the first set of text in the first document.

37. The system of claim 27 wherein the results of the first search in the second window includes highlighted symbols corresponding to a search criteria of the first search.

38. The method of claim 27 wherein the activated application program is a word processing program.

39. The system of claim 27 further comprising:
   e) means for initiating a second search within a second document based upon a second user interaction with the application program; and
   f) means for displaying the results of the second search in the third window wherein the first window continues to display the first set of text in the first document and the second window continues to display the first search results.

* * * * *

UNITED STATES PATENT AND TRADEMARK OFFICE
CERTIFICATE OF CORRECTION

PATENT NO. : 6,718,518 B1
DATED : April 6, 2004
INVENTOR(S) : Plow et al.

It is certified that error appears in the above-identified patent and that said Letters Patent is hereby corrected as shown below:

Column 9,
Line 4, delete "14" and replace with -- 15 --.
Line 7, delete "method" and replace with -- computer readable medium --.
Line 16, delete "11" and reaplace with -- 14 --.
Line 31, delete "method" and replace with -- computer readable medium --.

Column 10,
Lines 20 and 40, delete "method" and reaplace with -- system --.

Signed and Sealed this

Third Day of August, 2004

JON W. DUDAS
*Acting Director of the United States Patent and Trademark Office*